US012578311B2

(12) United States Patent
Balasubramanian et al.

(10) Patent No.: US 12,578,311 B2
(45) Date of Patent: Mar. 17, 2026

(54) STAGGERED MAGNET ARRAY (SMA) BASED ELECTROMAGNETIC ACOUSTIC TRANSDUCER (EMAT)

(71) Applicant: Indian Institute of Technology Madras (IIT Madras), Chennai (IN)

(72) Inventors: Krishnan Balasubramanian, Chennai (IN); Siddharth Shankar, Chennai (IN)

(73) Assignee: Indian Institute of Technology Madras (IIT Madras), Chennai (IN)

( * ) Notice: Subject to any disclaimer, the term of this patent is extended or adjusted under 35 U.S.C. 154(b) by 323 days.

(21) Appl. No.: 17/779,628

(22) PCT Filed: Nov. 6, 2020

(86) PCT No.: PCT/IN2020/050936
§ 371 (c)(1),
(2) Date: May 25, 2022

(87) PCT Pub. No.: WO2021/106011
PCT Pub. Date: Jun. 3, 2021

(65) Prior Publication Data
US 2023/0018319 A1     Jan. 19, 2023

(30) Foreign Application Priority Data
Nov. 28, 2019     (IN) .............................. 201941048866

(51) Int. Cl.
*G01N 29/24* (2006.01)
*G01N 29/04* (2006.01)
*G01N 29/26* (2006.01)

(52) U.S. Cl.
CPC ....... *G01N 29/2412* (2013.01); *G01N 29/043* (2013.01); *G01N 29/262* (2013.01); *G01N 2291/0422* (2013.01)

(58) Field of Classification Search
CPC ............. G01N 29/2412; G01N 29/043; G01N 29/262; G01N 2291/0422; G01N 2291/106
See application file for complete search history.

(56) References Cited

U.S. PATENT DOCUMENTS

| | | | |
|---|---|---|---|
| 2003/0159516 A1* | 8/2003 | Hubschen ................. | B06B 1/04 73/643 |
| 2014/0028300 A1* | 1/2014 | Jamoussi ............... | G01N 27/82 324/220 |
| 2018/0100387 A1* | 4/2018 | Kouchmeshky ....... | G01N 29/34 |
| 2019/0094184 A1* | 3/2019 | Ren .................... | G01N 29/2412 |

* cited by examiner

*Primary Examiner* — Stephen D Meier
*Assistant Examiner* — Quang X Nguyen
(74) *Attorney, Agent, or Firm* — Morgan, Lewis & Bockius LLP

(57) ABSTRACT

A staggered magnet array (SMA) based electromagnetic acoustic transducer (EMAT) system and method for controlling the direction of the ultrasonic waves in the electromagnetic acoustic transducer (EMAT) using staggered magnet array (SMA) configurations, is disclosed herein. The EMAT device proposed herein comprises at least one conductive racetrack coil and at least two magnet arrays wherein the magnet array comprises of permanent magnets, where each magnet is oriented according to a specific configuration to produce ultrasonic waves in order to form an ultrasonic beam by shifting the position of the magnet arrays up or down creating a SMA configuration.

14 Claims, 5 Drawing Sheets

X — Magnetic field in-plane (B)
O — Magnetic field out-of-plane (B)

⟶ Eddy current direction (J)

X — Magnetic field in-plane (B)
O — Magnetic field out-of-plane (B)

⟶ Eddy current direction (J)

X – Magnetic field in-plane (B)
O – Magnetic field out-of-plane (B)

⟶ Eddy current direction (J)

X – Magnetic field in-plane (B)
O – Magnetic field out-of-plane (B)

⟶ Eddy current direction (J)

X – Magnetic field in-plane (B)
O – Magnetic field out-of-plane (B)

⟶ Eddy current direction (J)

STAGGERED MAGNET ARRAY (SMA) BASED ELECTROMAGNETIC ACOUSTIC TRANSDUCER (EMAT)

TECHNICAL FIELD

The present invention generally relates to electromagnetic acoustic transducer (EMAT) systems and methods. The present invention is additionally related to nondestructive testing and evaluation techniques for testing electrically conductive components in ultrasound applications. The present invention also relates to magnetic arrays, such as PPM EMAT and HALBACH EMAT for electromagnetic acoustic transducer (EMAT) systems. The present invention further relates to apparatus and methods for forming and controlling direction of ultrasonic waves in electromagnetic acoustic transducer (EMAT) systems. The present invention is more particularly related to a staggered magnet array (SMA) based electromagnetic acoustic transducer (EMAT) system and method for controlling the direction of the ultrasonic waves in the electromagnetic acoustic transducer (EMAT) using staggered magnet array (SMA) configurations.

BACKGROUND OF THE INVENTION

Nondestructive evaluation (NDE) inspection systems are increasingly popular in a wide range of industrial applications for conducting inspections or continuous monitoring on the condition of critical components in the industrial application. In addition, such inspection systems are designed to ensure that the testing environment is left untouched as much as possible.

Ultrasonic testing (UT) is one of the popular NDE techniques and is considered to be a very useful and versatile inspection method. Conventional UT systems use contact piezoelectric transducers (PZT) to generate and receive ultrasounds during inspections. However, PZT systems require a liquid couplant between the PZT transducer and the inspected sample in order to transfer the ultrasound into the test specimen, making it less practical in certain harsh industrial applications.

As an alternative, EMATs are increasingly popular because a couplant is not required, meaning no direct contact with the test specimen is required. Moreover, the design of EMATs enable users to generate specific wave modes and the ultrasound is produced immediately below the surface of the inspected specimen. Unlike PZTs, EMATs provide greater accuracy and reliability for harsh applications in which the test material is contaminated, rough or hot. EMATs are primarily used for inspecting electrically conductive components since it uses electromagnetic mechanisms to generate and receive ultrasonic waves. The generation and reception of ultrasonic waves in such EMATs is mainly via two mechanisms, Lorentz force and magnetostriction. Such EMATs can be typically configured into different forms such as for example, but not limited to a PPM configuration or Halbach magnet array configuration based on the intended industrial application.

For example, PPM configuration based EMAT is based on the Lorentz Force mechanism. A standard PPM EMAT device consists of a racetrack coil and magnet arrays with alternating polarity. A typical PPM EMAT device has alternating current (AC) running through the coil at a particular frequency (ultrasonic frequency). When the coil is placed near the surface of an electrically conducting specimen, eddy currents are induced in the near surface region of the object. The current passing through the EMAT coil generates an electromagnetic field which induces eddy currents. The PPM arrangement of magnets creates an alternating Lorentz forces (F) due to the interaction between the induced eddy current (J) and the static magnetic field (B). This relationship is shown in Equation 1.

$$F = J \times B \qquad (1)$$

The sum of these alternating Lorentz forces produce shear horizontal waves (SH), at the same frequency as the induced eddy currents, within the inspected specimen. SH waves are horizontally polarized ultrasonic shear waves (polarized parallel to the surface of the sample). SH waves are desirable for inspections on flat plates because they are non-dispersive which means the phase and group velocities of SH waves do not change with frequency simplifying the interpretation of the signal output. It is also difficult to generate SH waves using PZTs.

Another alternative EMAT design, which uses the linear Halbach magnet array arrangement and racetrack coil, also produces SH waves. The magnets within a Halbach array are arranged and orientated such that the strength of the array's magnetic fields is strong on one side of the array while weak on the opposite side. The development of these Halbach EMATs systems are primarily motivated by the fact that larger ultrasonic signals can be generated due to the larger bias magnetic field created by the Halbach arrangement. However, the wavelength of the SH waves is two times longer than PPM EMATs, since four magnets are required for the Halbach array pattern while PPM array patterns need two magnets.

Beam steering, which was initially performed with ultrasonic phased array systems, allows the user to control the direction at which ultrasonic waves propagate inside a material without angled wedges. In the case of PPM EMATs, it has been shown that beam steering of SH waves can be achieved. The techniques developed directed the SH waves into the specimen to detect sub surface defects. Majority of the prior art EMATs, both PPM and Halbach array EMATs are unable to control the direction of the ultrasonic wave where the magnetic configurations are constant in the prior art EMATs. The prior art EMATs are therefore unable to offer a flexible and simple solution for the users to modify and tweak the magnet configuration depending on the industrial application.

Based on the foregoing, a need therefore exists for an improved staggered magnet array (SMA) based electromagnetic acoustic transducer (EMAT) system for controlling the direction of ultrasonic wave depending on the industrial application. Also, a need exists for a staggered magnet array (SMA) based electromagnetic acoustic transducer (EMAT) system and method for controlling the direction of the ultrasonic waves in the electromagnetic acoustic transducer (EMAT) using staggered magnet array (SMA) configurations, as discussed in greater detail herein.

SUMMARY OF THE INVENTION

The following summary is provided to facilitate an understanding of some of the innovative features unique to the disclosed embodiment and is not intended to be a full description. A full appreciation of the various aspects of the embodiments disclosed herein can be gained by taking the entire specification, claims, drawings, and abstract as a whole.

Therefore, one aspect of the disclosed embodiment is to provide for electromagnetic acoustic transducer (EMAT) for a wide range of industrial applications.

It is another aspect of the disclosed embodiment to provide for an improved staggered magnet array (SMA) based electromagnetic acoustic transducer (EMAT) system for controlling the direction of ultrasonic wave depending on the industrial application.

It is a further aspect of the disclosed embodiment to provide for an improved staggered magnet array (SMA) based electromagnetic acoustic transducer (EMAT) system and method for controlling the direction of the ultrasonic waves in the electromagnetic acoustic transducer (EMAT) using staggered magnet array (SMA) configurations, as discussed in greater detail herein.

The aforementioned aspects and other objectives and advantages can now be achieved as described herein. A staggered magnet array (SMA) based electromagnetic acoustic transducer (EMAT) system and method for controlling the direction of the ultrasonic waves in the electromagnetic acoustic transducer (EMAT) using staggered magnet array (SMA) configurations, is disclosed herein. The EMAT device proposed herein comprises at least one conductive racetrack coil and at least two magnet arrays wherein the magnet array comprises of permanent magnets, where each magnet is oriented according to a specific configuration to produce ultrasonic waves in order to form an ultrasonic beam by shifting the position of the magnet arrays up or down creating a SMA configuration. The beam forming technique has been tested with periodic permanent magnet (PPM) configuration, the linear Halbach array magnet configuration (HBA) and a hybrid configuration (combination of PPM and HBA). The SMA based EMAT proposed herein allow for a fixed frequency electrical input to provide different ultrasonic or acoustic beams using mechanical movements to stagger the magnet arrays thereby enabling to generate different ultrasonic beams using the SMA based EMAT in a wide range of industrial applications.

The magnetic configurations in the SMA based EMAT can be dynamically manipulated through the mechanical movement of the magnet arrays, thereby manipulating the ultrasonic beams from the EMAT. The SMA based EMAT allows for the dynamic or static focusing or defocusing of ultrasonic beams and thereby enhance the results or data obtained in the industrial application. The EMAT further allows the operator to steer the beam at different angles using a single transducer. The SMA based EMAT can have small footprint, low cost, and offer a universal solution for producing static or dynamic beam forming through simple mechanical movement of the magnets. In addition, beam forming has been observed when using multiple magnet arrays, including EMAT configurations with two, three, four and five magnet arrays.

BRIEF DESCRIPTION OF DRAWINGS

The drawings shown here are for illustration purpose and the actual system will not be limited by the size, shape, and arrangement of components or number of components represented in the drawings.

DETAILED DESCRIPTION

The particular values and configurations discussed in these non-limiting examples can be varied and are cited merely to illustrate at least one embodiment and are not intended to limit the scope thereof.

A staggered magnet array (SMA) based electromagnetic acoustic transducer (EMAT) system and method for controlling the direction of the ultrasonic waves in the electromagnetic acoustic transducer (EMAT) using staggered magnet array (SMA) configurations, is disclosed herein. The EMAT device proposed herein comprises at least one conductive racetrack coil and at least two magnet arrays wherein the magnet array comprises of permanent magnets, where each magnet is oriented according to a specific configuration to produce ultrasonic waves in order to form an ultrasonic beam by shifting the position of the magnet arrays up or down creating a SMA configuration. The beam forming technique has been tested with periodic permanent magnet (PPM) configuration, the linear Halbach array magnet configuration (HBA) and a hybrid configuration (combination of PPM and HBA).

Figure 1:
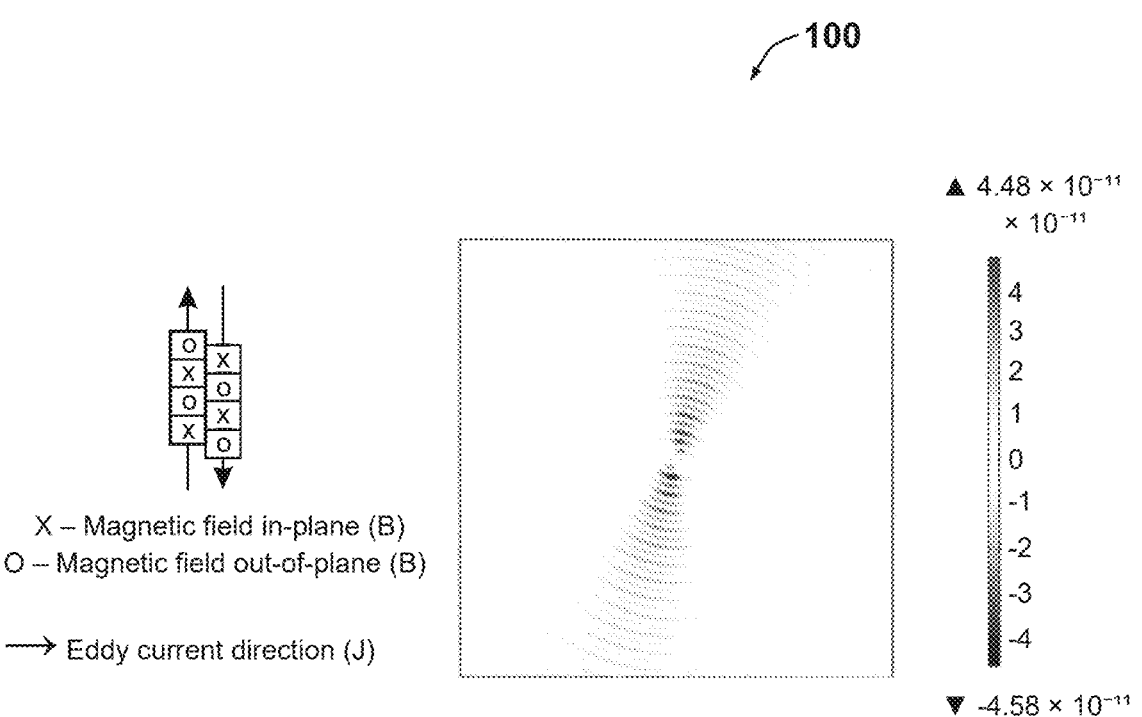
FIG. 1 illustrates a graphical representation illustrating the staggered magnet array (2 array) PPM EMAT and the SH waves generated using the staggered 2 array PPM EMAT where $2^{nd}$ magnet array is shifted down by wavelength ($\lambda$)/8, in accordance with the disclosed embodiments.

FIG. 1 illustrates a graphical representation 100 illustrating the staggered magnet array (2 array) PPM EMAT 110 and the SH waves 120 generated using the staggered 2 array PPM EMAT where 2nd magnet array is shifted down by wavelength ($\lambda$)/8, in accordance with the disclosed embodiments. The EMAT 110 includes at least two magnet arrays 102. The scheme of generating shear horizontal ultrasonic waves with EMAT is performed using the PPM configuration as shown in FIG. 1. Alternatively, the Halbach array (HBA) configuration (FIG. 2) can also be used to produce SH waves. In both cases, racetrack coils 104 are required for the AC travel path. The interaction between the bias magnetic field (from the PPM and Halbach arrangement) and the eddy current generated from the AC in the coil 104 create alternating Lorentz forces, forming SH waves.

Figure 2:
FIG. 2 illustrates a graphical representation illustrating the staggered magnet array (2 array) HBA EMAT and the SH waves generated using the staggered 2 array HBA EMAT where $2^{nd}$ magnet array is shifted down by wavelength ($\lambda$)/4, in accordance with the disclosed embodiments.
Figure 2:
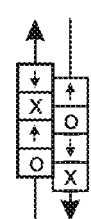
Figure 2:
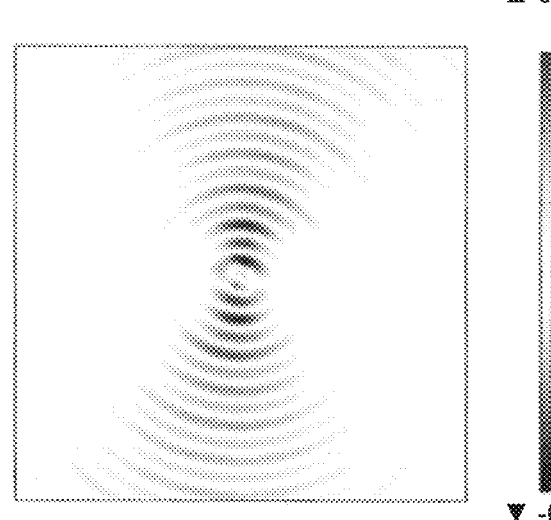
Figure 2:
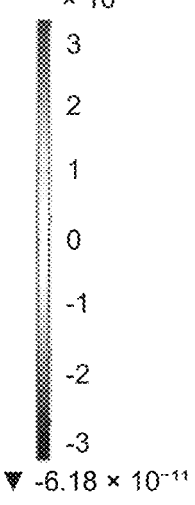

FIG. 2 illustrates a graphical representation 200 illustrating the staggered magnet array (2 array) HBA EMAT 210 and the SH waves 220 generated using the staggered 2 array HBA EMAT where 2nd magnet array is shifted down by wavelength ($\lambda$)/4, in accordance with the disclosed embodiments. The EMAT 210 includes at least two magnet arrays 102. The selection of the ultrasonic frequency is dependent on the EMAT wavelength ($\lambda$) and the ultrasonic shear wave velocity within the inspected material. Using the Dispersion curve, one can select the EMAT frequency based on the material velocity and wavelength (λ) to generate the desired wave mode. For inspections, a single SH wave mode is desired since it simplifies the post processing and analysis. However, there is always a possibility that multiple SH guided wave modes will be formed due to multiple factors such as ultrasonic frequency, shear wave velocity, material thickness and microstructure.

When individual magnet arrays, PPM or HBA, in the EMAT transmitter are shifted vertically up or down, a SMA configuration is formed. The bias magnetic field from the SMA interacts with the eddy current generated by the racetrack coil 104. The alternating Lorentz forces, created by the interaction, are skewed due to the position shifts in the magnet arrays resulting in bi-directional SH waves which are formed along the surface of the specimen, at an angle away from the central axis. We call this phenomenon, "Beam Forming".

Note that FIG. 1 & FIG. 2 demonstrates an exemplary arrangement of EMAT using PPM and HBA configurations. The FIG. 1 and FIG. 2 should not be constituted any limited sense. FIG. 1 and FIG. 2 are only exemplary representations demonstrating working of the invention. The staggered magnet arrays can be arranged in a wide range of possibilities for both PPM and HBA configurations and any other EMAT configuration without limiting the scope of the proposed invention.

Figure 3:
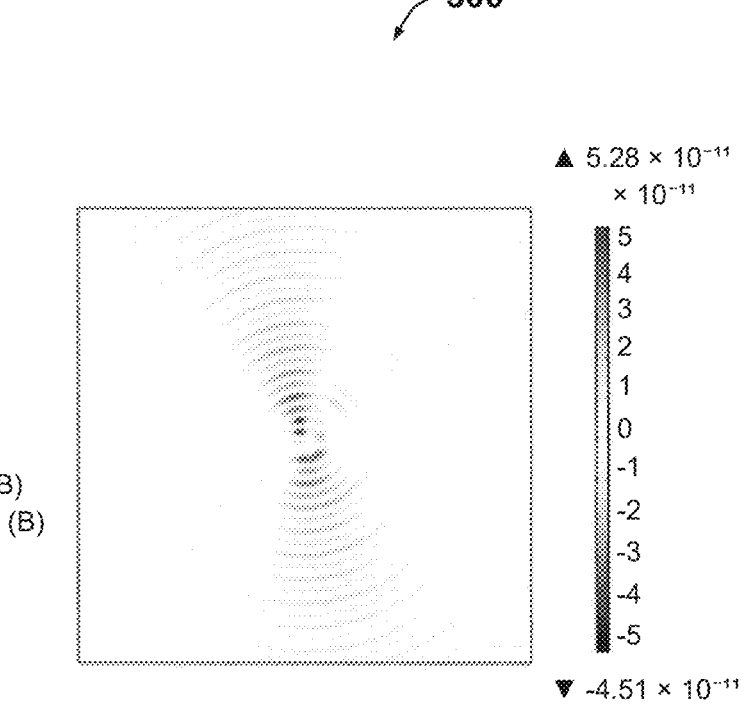
FIG. 3 illustrates a graphical representation illustrating the staggered magnet array (2 array) hybrid (PPM-HBA) EMAT and the SH waves generated using the staggered 2 array magnet array shifted down 5 mm (wavelength ($\lambda$)/4 for PPM and wavelength ($\lambda$)/8 for Halbach), in accordance with the disclosed embodiments.

FIG. 3 presents a graphical representation of the staggered magnet array (2 array) hybrid (PPM-HBA) EMAT and the SH waves generated using the staggered 2 array magnet array shifted down 5 mm (wavelength (λ)/4 for PPM and wavelength (λ)/8 for Halbach), in accordance with the disclosed embodiments. Additional simulation studies were conducted to observe if using a combination of PPM and Halbach array (Staggered Hybrid EMAT) can produce beam forming. In the experiments, the optimum frequency for PPM was found to be 156 kHz while the optimum frequency for HBA EMAT was around 80 kHz. This is because the wavelength of the PPM array is 20 mm while wavelength of the Halbach array is 40 mm. Since the setup contains both PPM and Halbach array, the chosen EMAT frequency was 118 kHz, which is the midpoint frequency between 80 kHz and 156 kHz.

Figure 4:
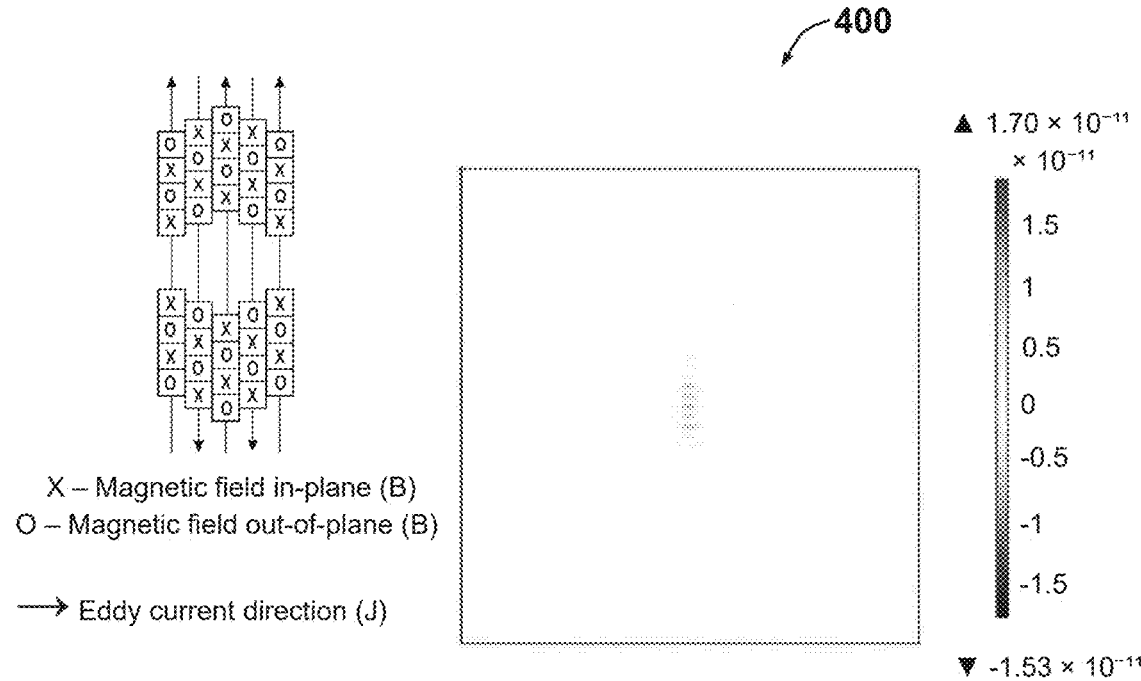
FIG. 4 illustrates a graphical representation illustrating multiple staggered magnet array section PPM EMAT and the SH waves generated using multiple staggered magnet array section PPM EMAT, in accordance with the disclosed embodiments.
Figure 5:
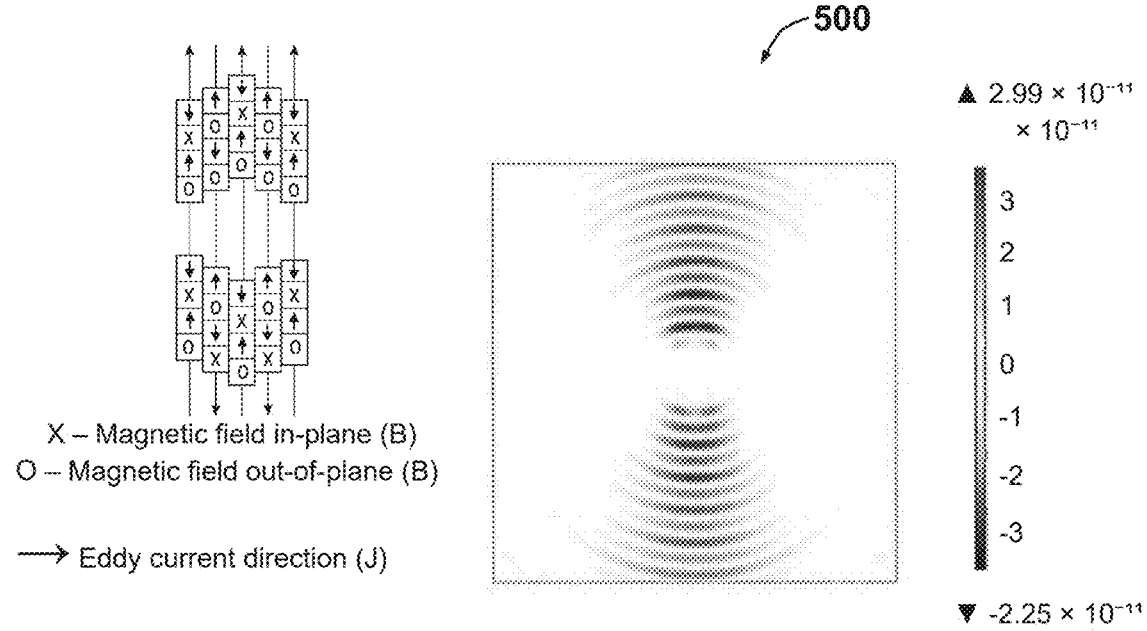
FIG. 5 illustrates a graphical representation illustrating multiple staggered magnet array section HBA EMAT and the SH waves generated using multiple staggered magnet array section HBA EMAT, in accordance with the disclosed embodiments.

FIG. 4 illustrates a graphical representation 400 illustrating multiple staggered magnet array section PPM EMAT and the SH waves generated using multiple staggered magnet array section PPM EMAT, in accordance with the disclosed embodiments and FIG. 5 illustrates a graphical representation 500 illustrating multiple staggered magnet array section HBA EMAT and the SH waves generated using multiple staggered magnet array section HBA EMAT, in accordance with the disclosed embodiments. The EMAT configurations presented previously shows the staggered magnet arrays arranged and grouped next to each other in one specific area. FIG. 4 and FIG. 5 demonstrates that the staggered array concept can be applied to EMAT configurations with multiple magnet sections. In both cases, ultrasonic waves are generated within the sample, just beneath the magnet sections.

Again, note that the configurations illustrated in FIG. 1-5 should not be constituted in any limited sense. The configurations are only exemplary perspectives for working of the invention. Several additional configurations are possible within the scope of the proposed invention. The SMA based EMAT proposed herein allow for a fixed frequency electrical input to provide different ultrasonic or acoustic beams using mechanical movements to stagger the magnet arrays thereby enabling to generate different ultrasonic beams using the SMA based EMAT in a wide range of industrial applications.

The magnetic configurations in the SMA based EMAT can be dynamically manipulated through the mechanical movement of the magnet arrays, thereby manipulating the ultrasonic beams from the EMAT. The SMA based EMAT allows for the dynamic or static focusing or defocusing of ultrasonic beams and thereby enhance the results or data obtained in the industrial application. The EMAT further allows the operator to steer the beam at different angles using a single transducer. The SMA based EMAT can have small footprint, low cost, and offer a universal solution for producing static or dynamic beam forming through simple mechanical movement of the magnets. As demonstrated in the FIG. 1-5, the beam forming has been observed when using multiple magnet arrays, including EMAT configurations with two, three, four and five magnet arrays.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

We claim:

1. A staggered magnet array (SMA) based electromagnetic acoustic transducer (EMAT) system, comprising:
   at least one conductive racetrack coil; and
   at least two magnet arrays configured to create a magnetic field;
   wherein the at least two magnet arrays further include a plurality of permanent magnets, and each magnet is oriented according to a specific configuration;
   wherein the conductive racetrack coil is configured to, when driven by an alternating current, interact with the magnetic field from the magnet arrays to generate Lorentz forces and produce ultrasonic beams; and,
   wherein the at least two magnet arrays are configured to mechanically move with respect to each other according to an SMA configuration and control a direction of the ultrasonic beams via mechanical movement of the at least two magnet arrays.

2. The system as claimed in claim 1, wherein the at least two magnet arrays are arranged in a periodic permanent magnet (PPM) configuration.

3. The system as claimed in claim 1, wherein the at least two magnet arrays are arranged in a linear Halbach array magnet configuration (HBA).

4. The system as claimed in claim 1, wherein the at least two magnet arrays are arranged in a hybrid configuration including a combination of PPM and HBA.

5. The system as claimed in claim 1, wherein the SMA based EMAT system allow for a fixed frequency electrical input to provide different ultrasonic or acoustic beams using the mechanical movement of the at least two magnet arrays to stagger the magnet arrays thereby enabling to generate different ultrasonic beams in a wide range of industrial applications, wherein a fixed frequency electrical input is applied to the conductive racetrack coil.

6. The system as claimed in claim 1, wherein the SMA based EMAT system has a plurality of magnetic configurations, and the magnetic configurations in the SMA based EMAT system and the ultrasonic beams from the SMA based EMAT system are configured to be dynamically manipulated through a mechanical movement of the magnet arrays.

7. The system as claimed in claim 1, wherein the SMA based EMAT system allows for dynamic or static focusing or defocusing of the ultrasonic beams and thereby enhance results or data obtained in an industrial application, wherein the mechanical movement shifts positions of the at least two magnet arrays up or down thereby adjusting the positions of the magnet arrays to enable the dynamic or static focusing or defocusing of the ultrasonic beams.

8. The system as claimed in claim 1, wherein the at least two magnet arrays for beam forming comprises one of: two array EMAT configuration, three array EMAT configuration, four array EMAT configuration, five array EMAT configuration and multi-array EMAT configuration.

9. The system as claimed in claim 1, wherein the SMA based EMAT system is configured to provide a universal solution for producing static or dynamic beam forming through simple mechanical movement of the at least two magnet arrays.

10. The system as claimed in claim 1, wherein the at least two magnet arrays are arranged in a staggered configuration with each array shifted vertically relative to adjacent arrays.

11. The system of claim 1, wherein the at least two magnet arrays are symmetric with respect to each of a center, a horizontal line passing the center, and a vertical line passing the center.

12. The system of claim 1, wherein the at least two magnet arrays include a first magnet array and a second magnet array that is shifted down by $\lambda/8$ with respect to the first magnetic array, where $\lambda$ is a wavelength of an ultrasonic wave associated with the ultrasonic beams.

13. The system of claim 1, wherein the at least two magnet arrays includes a first magnet array and a second magnet array that is shifted down by $\lambda/4$ with respect to the first magnetic array, where $\lambda$ is a wavelength of an ultrasonic wave associated with the ultrasonic beams.

14. The system of claim 1, wherein the at least two magnet arrays include a first magnet array and a second magnet array, and at least portion of the first magnet array is in physical contact with at least a portion of the second magnet array.

\* \* \* \* \*